April 22, 1958     J. O. McCARTY     2,831,927
AUTOMATIC RECORDING AND ANNOUNCING MACHINE
Filed May 4, 1956     12 Sheets-Sheet 1
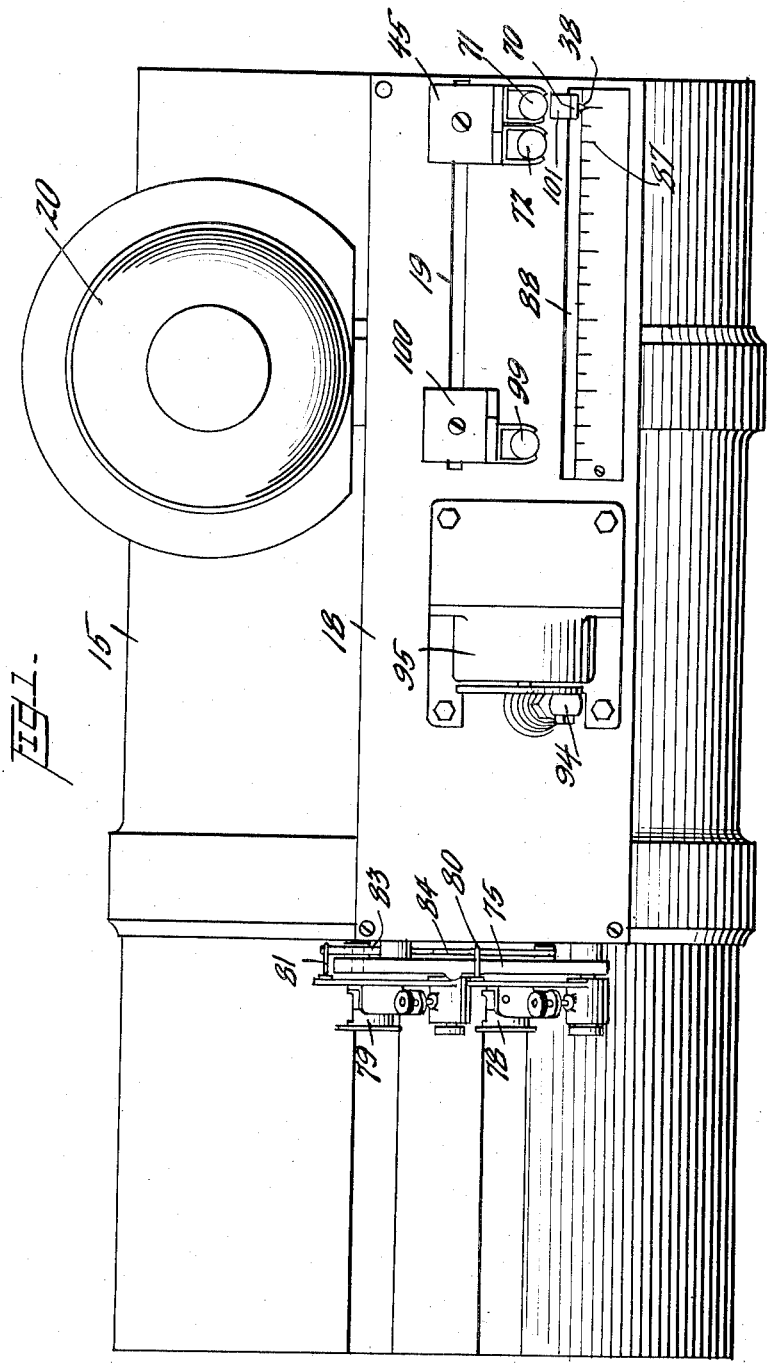
INVENTOR
JOHN O. McCARTY
BY
Watson, Cole, Grindle & Watson
ATTORNEYS

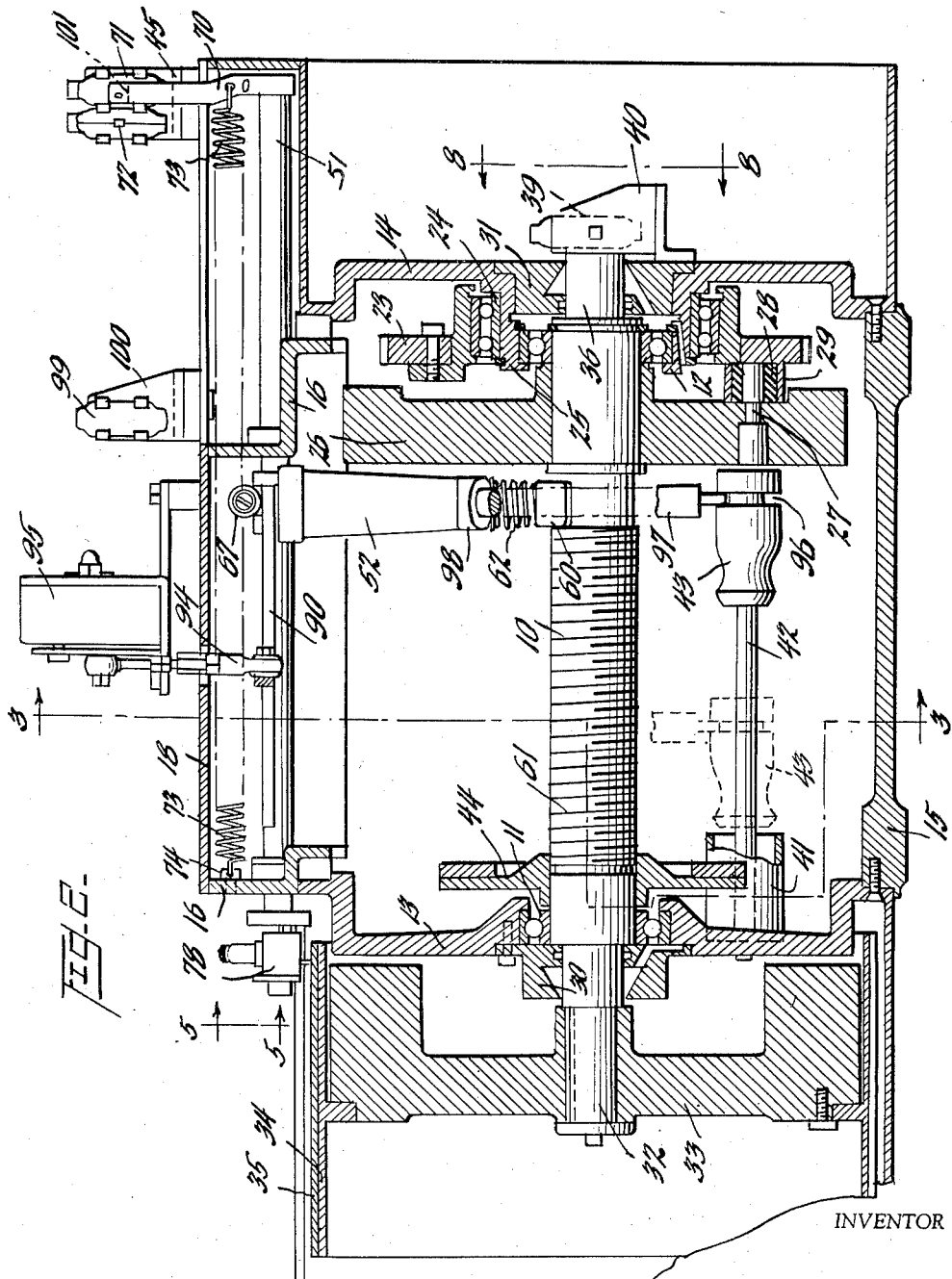

April 22, 1958    J. O. McCARTY    2,831,927
AUTOMATIC RECORDING AND ANNOUNCING MACHINE
Filed May 4, 1956    12 Sheets-Sheet 3
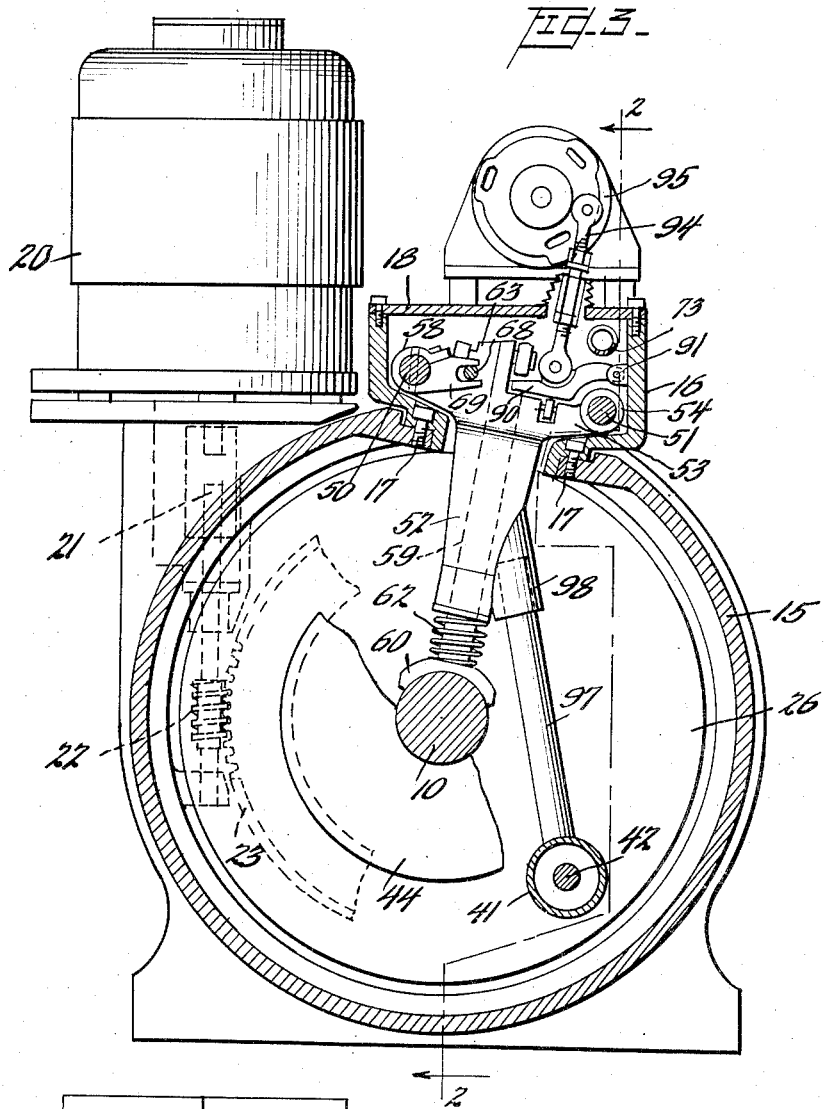
INVENTOR
JOHN O. McCARTY
BY
Watson, Cole, Grindle & Watson
ATTORNEYS April 22, 1958     J. O. McCARTY     2,831,927
AUTOMATIC RECORDING AND ANNOUNCING MACHINE
Filed May 4, 1956     12 Sheets-Sheet 4
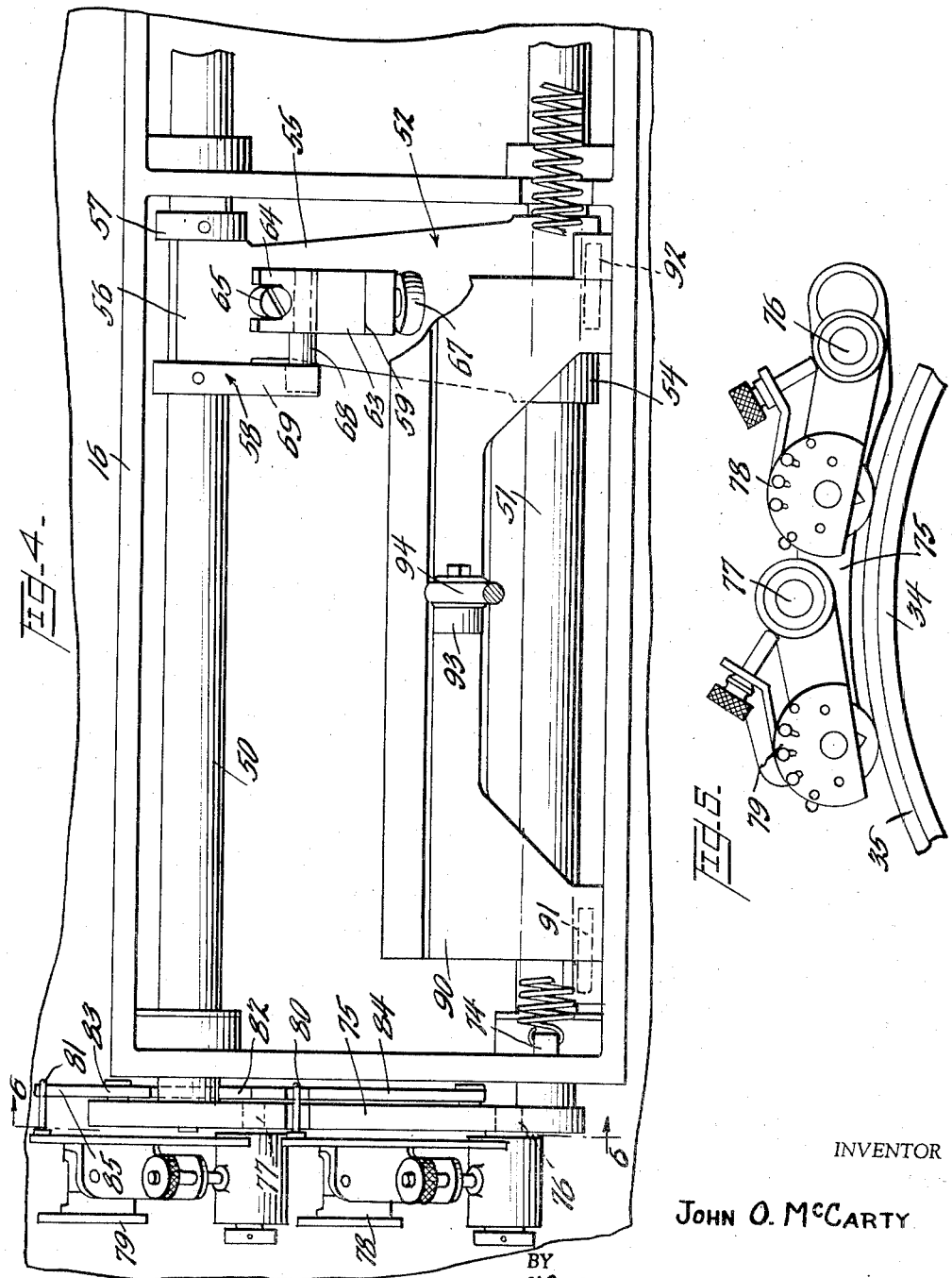
INVENTOR
JOHN O. McCARTY
BY
Watson, Cole, Grindle & Watson
ATTORNEYS

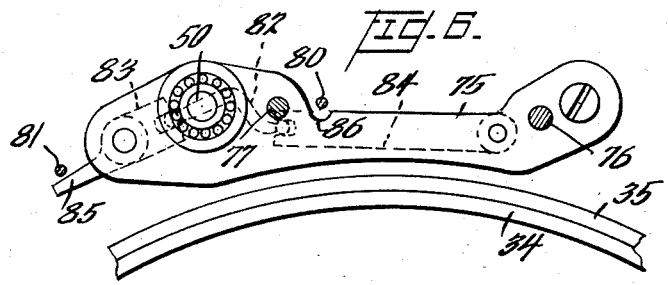
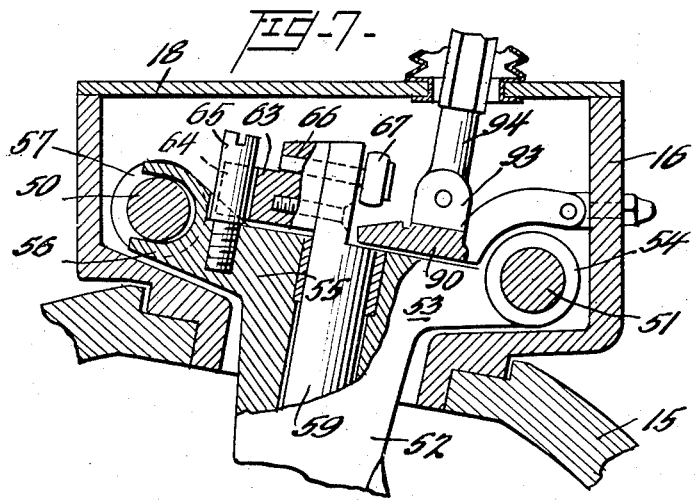
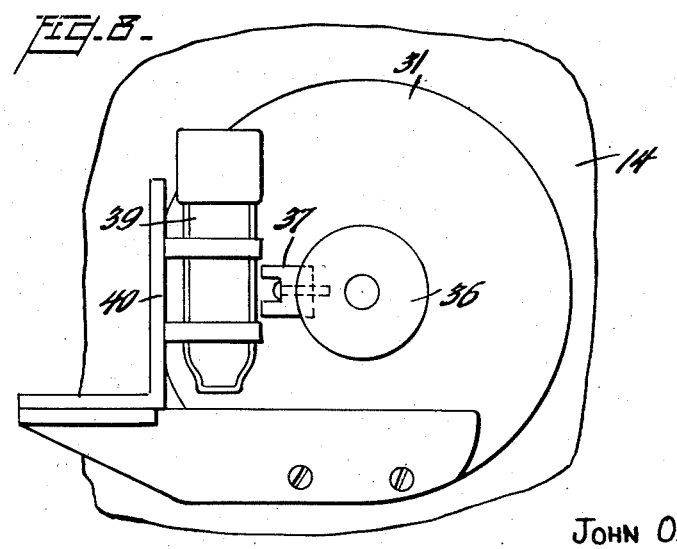

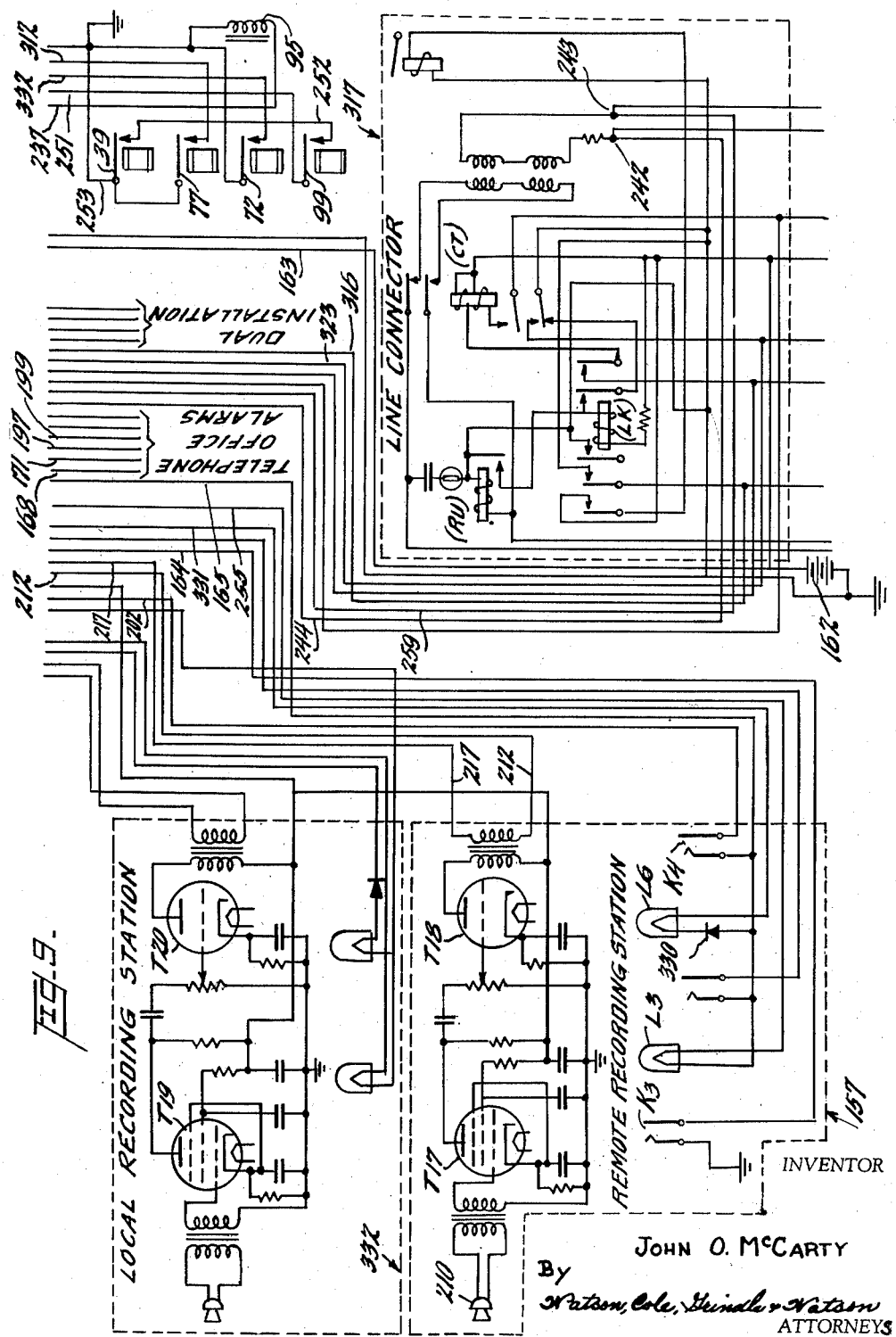

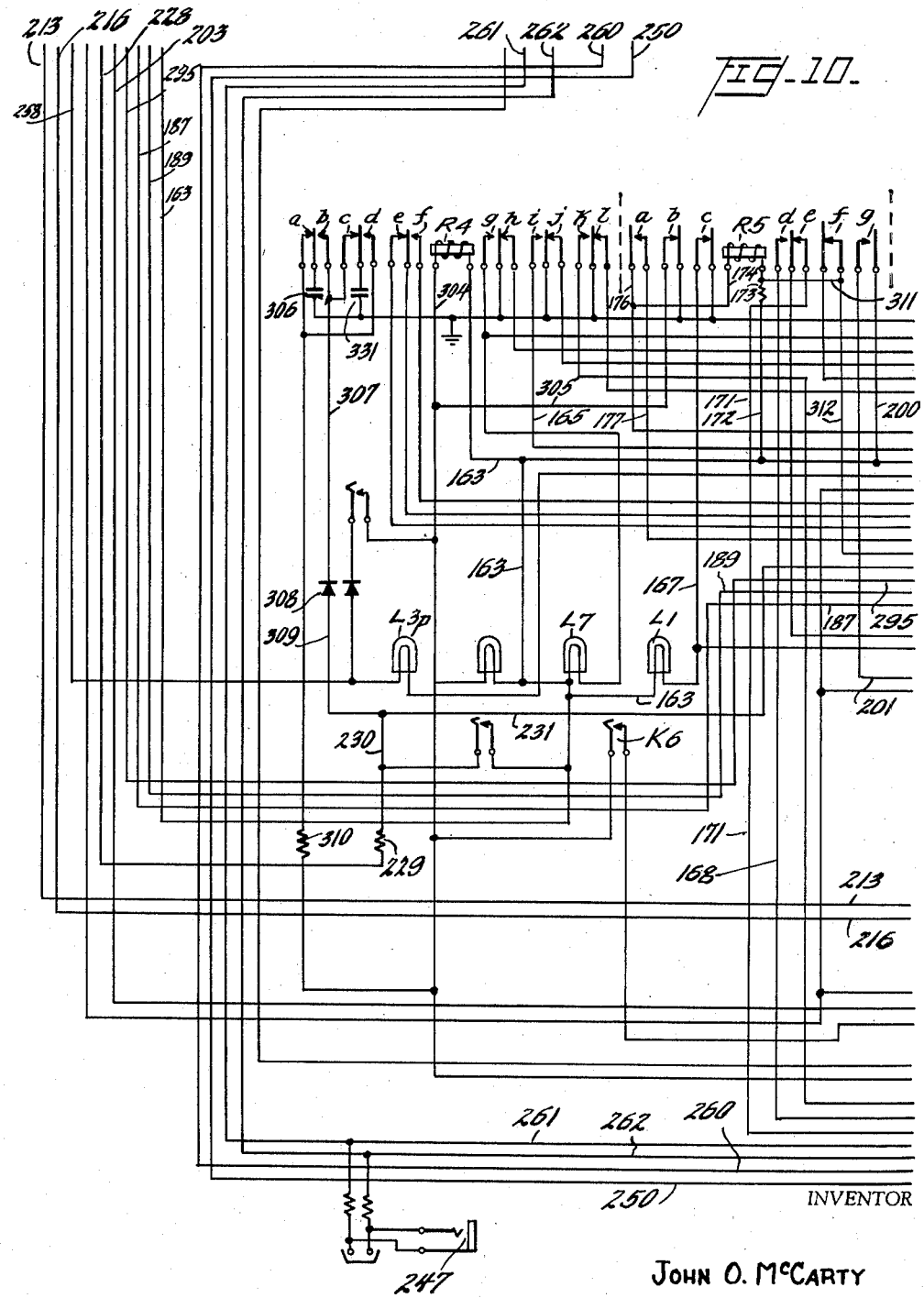

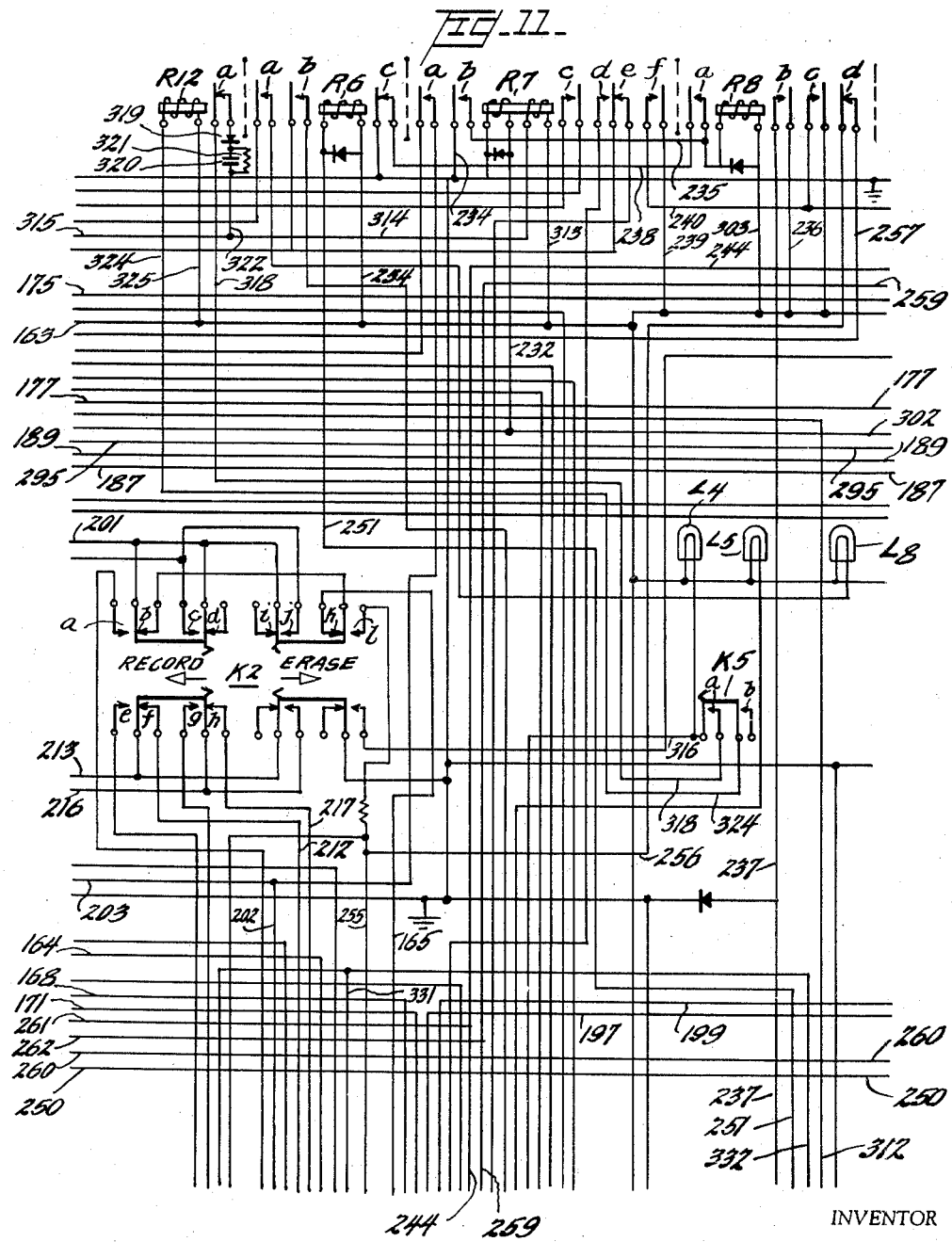

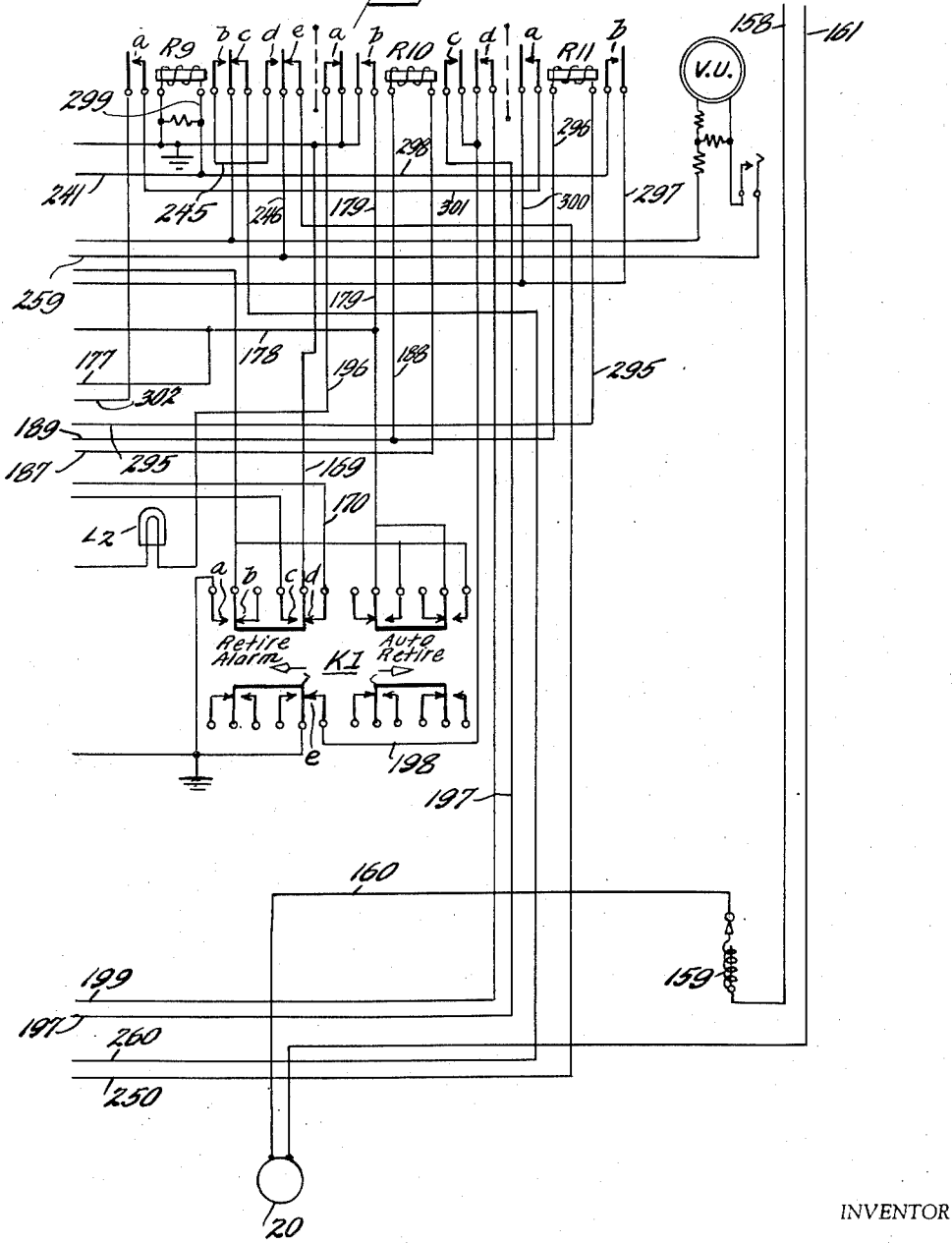

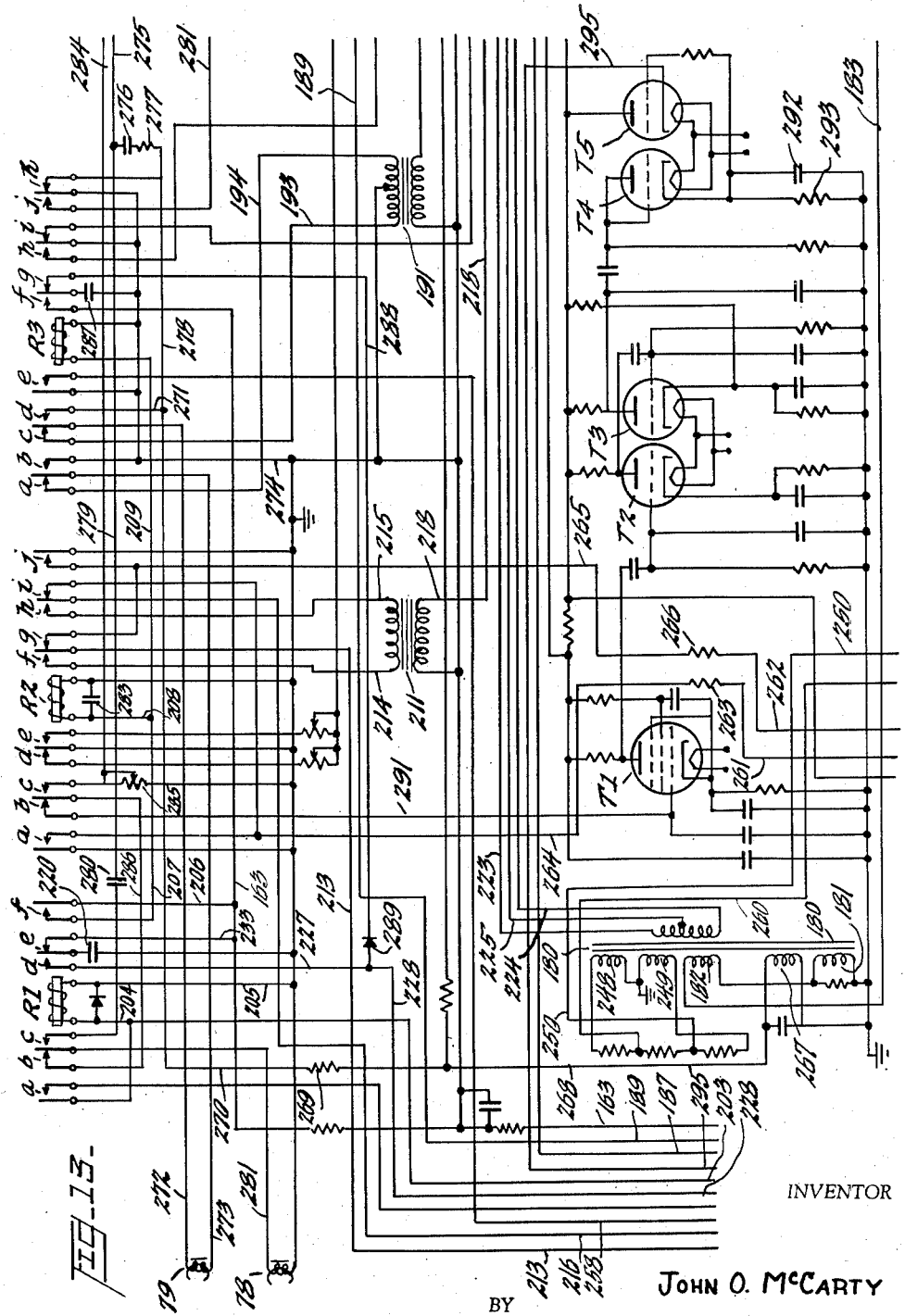

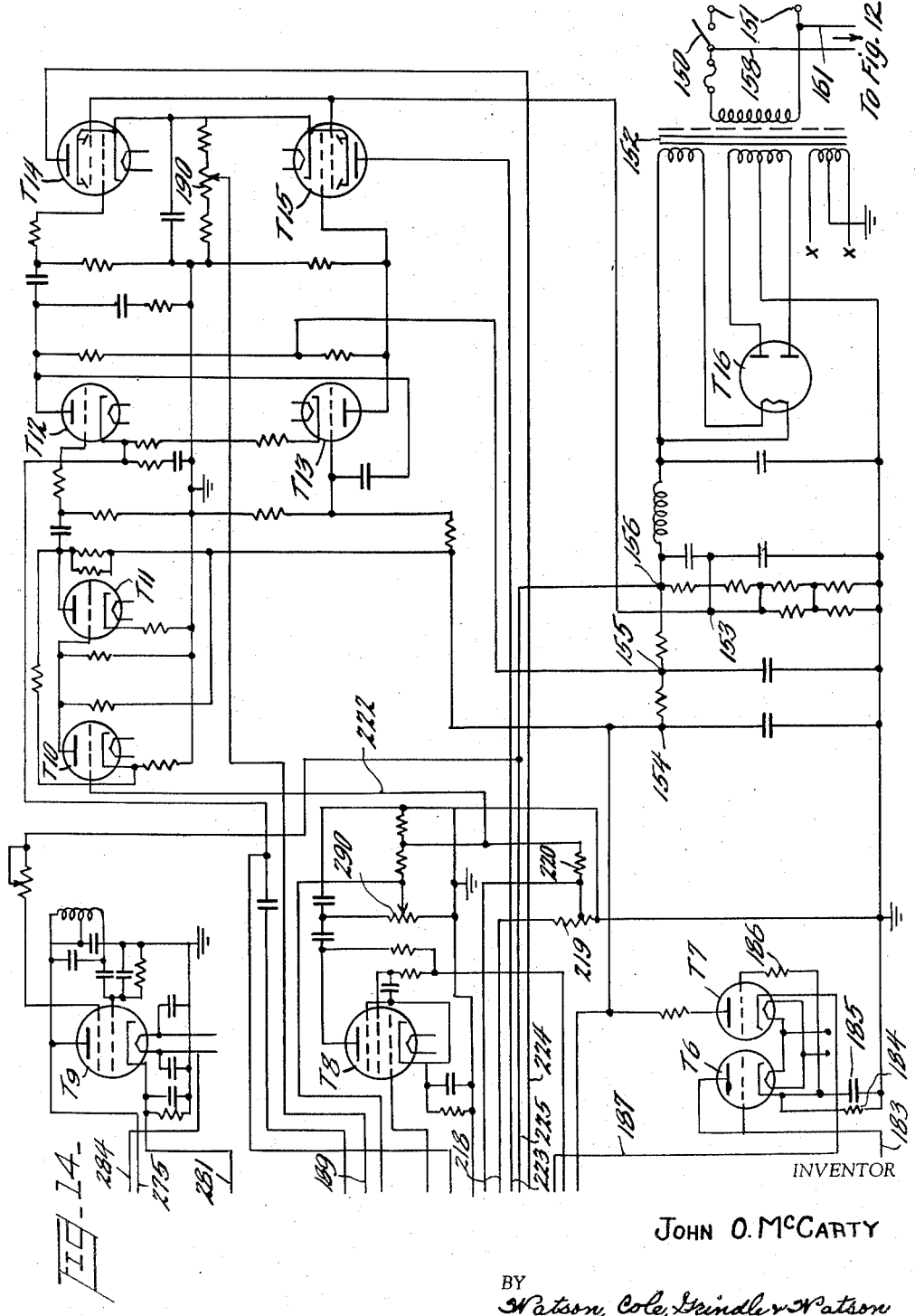

April 22, 1958     J. O. McCARTY     2,831,927
AUTOMATIC RECORDING AND ANNOUNCING MACHINE
Filed May 4, 1956     12 Sheets-Sheet 12
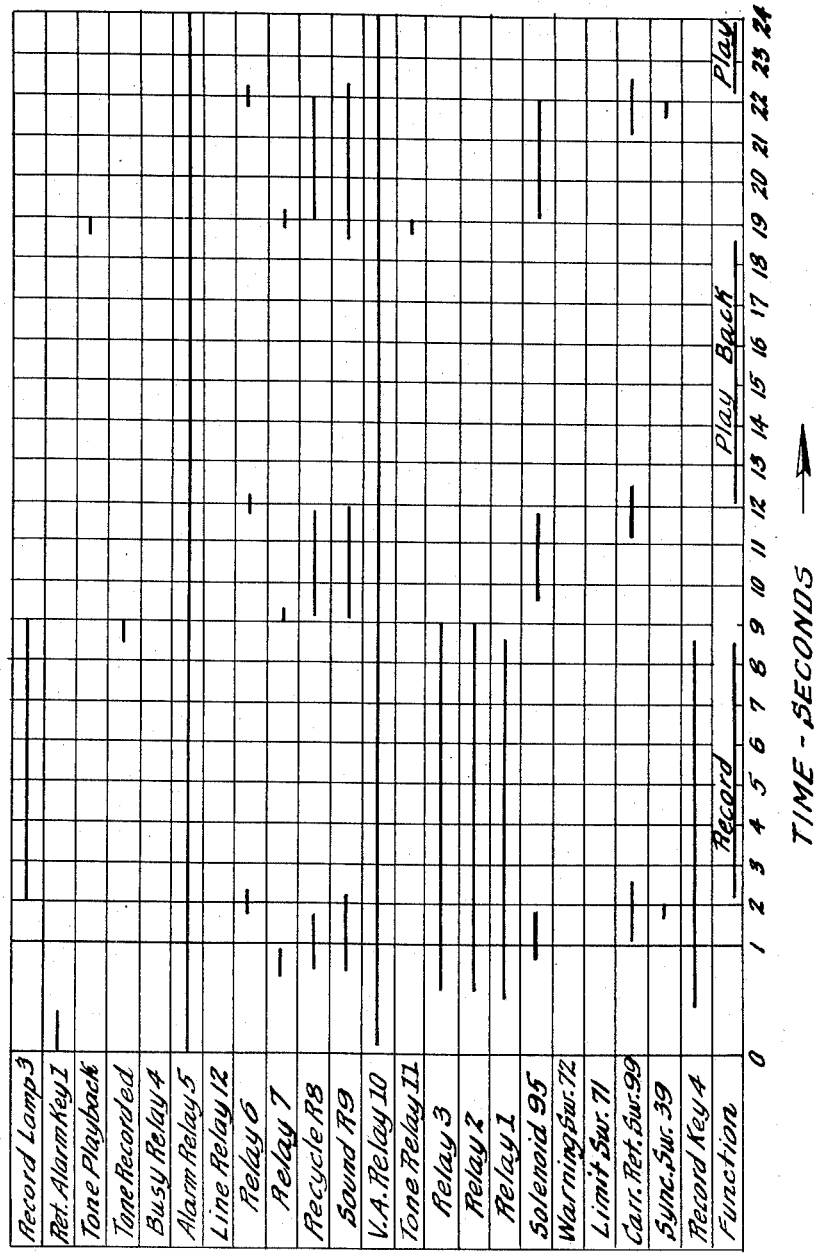
INVENTOR
JOHN O. McCARTY
BY
Watson, Cole, Grindle & Watson
ATTORNEYS

United States Patent Office 2,831,927
Patented Apr. 22, 1958

2,831,927

AUTOMATIC RECORDING AND ANNOUNCING MACHINE

John O. McCarty, Atlanta, Ga., assignor to John Leonard Franklin, Atlanta, Ga.

Application May 4, 1956, Serial No. 582,696

36 Claims. (Cl. 179—100.1)

This invention relates to automatic recording and announcing machines, sometimes referred to as announcing machines, of the type comprising a cylindrical record and means for cycling a sound reproducing mechanism axially of said record to reproduce the message recorded thereon and, repeatedly, broadcast said message through wired connections to telephone circuits or other distribution circuits. Machines of this general character are adapted to a wide variety of uses, particularly in connection with telephone systems, such as distributing inspirational messages, weather forecasts, and the like.

It is a primary object of the present invention to provide a machine of the general character described above, in which the recycling of the reproducing means is initiated by means of a tone pulse recorded at the conclusion of the recorder message, and without the interposition of mechanical instrumentalities which must be adjusted according to the duration of the recorder message.

Another object is the provision of an automatic transcription machine in which the maximum cycle duration is readily adjustable between the limits imposed by the physical characteristics of the machine so that the proprietor of the machine, for example a telephone company, may easily adjust the machine to meet the needs of a particular patron and, at the same time, so as to prevent the imposition of undue demands upon the telephone system with which it is associated.

Another object is the provision of warning means in association with the means for limiting the cycle duration or so that a person recording a message can be warned by light, buzzer or the like that he is approaching the end of the permissible message duration. In the event that the warning is disregarded and the message is extended to the cycle limit of the record, the record is recycled by structure including the means for limiting the cycle. This recycling operation also serves as a safeguard in the event that a record of permissible length is not recycled because of the failure of the recycling tone.

Another object is to provide an automatic transcription machine in which the sound carriage, which moves the various heads required for sound recording and sound reproducing axially with respect to the cylinder record, is accurately synchronized with the means for rotatably driving the cylinder record regardless of the point on the record at which a recycling operation is initiated. This improved mode of operation enables the reproduction of a recording to commence at the precise point at which the message was recorded on the cylinder record.

Another object is the improved supervision of the recording and reproducing operation so that an alarm is actuated in the event of sound failure for an adjustable predetermined period. This sound failure may be occasioned either by equipment failure or an excessive sound lapse in the application of the vocal or other message to be recorded. It can be readily appreciated that for purposes of reproducing messages over telephone networks, periods of no sound of the order of several seconds cannot be tolerated and therefore close monitoring this regard is required so that a defective recording can be re-recorded or maintenance personnel can be immediately assigned to restore the equipment to proper operating condition.

Another object is the adaptation of the foregoing alarm, which is responsive to a sound lapse, to effect a recycling of the record cylinder in the event of failure of the recycling tone to do so after the end of a message has been reached. This safeguard recycling step in the usual instance occurs prior to the safeguard recycling occasioned by operation of the record limit means which is actuated at the termination of the record cycle.

More specifically, it is an object of the invention to provide an automatic announcing machine comprising a cylindrical record, means to rotate the record about its axis, a carriage reciprocable in a path parallel to the axis and carrying recording and reproducing means in operative relation to the record, means for advancing the carriage in one direction, return means for moving the carriage in the opposite direction, means operatively connecting the carriage and said carriage-advancing means, and means responsive to a signal tone for disconnecting the carriage and the said advancing means in response to a signal recorded on the record.

Further objects include the provision of a machine comprising the combination defined in the preceding paragraph, and including novel mechanisms for driving the carriage and for disconnecting the carriage driving means to permit return of the carriage; novel means for lubricating the carriage driving means, and for cushioning the return movement of the carriage; novel means for insuring re-establishment of the driving connection at the precise moment of correct relationship of the driving and driven parts; and novel means for raising and lowering the recording and reproducing means relative to the record at the beginning and end of the return movement of the carriage.

Other and further objects, features and advantages will be apparent from the description which follows, read in connection with the accompanying drawings in which Figure 1 is a top plan view of an announcing machine constructed in accordance with the invention;

Figure 2 is a vertical longitudinal section approximately on line 2—2 of Figure 3;

Figure 3 is a vertical transverse section on line 3—3 of Figure 2;

Figure 4 is a fragmentary top plan view with cover plate removed;

Figure 5 is an end view on line 5—5 of Figure 2;

Figure 6 is a fragmentary sectional view on line 6—6 of Figure 4;

Figure 7 is a fragmentary sectional view, similar to Figure 3 but on an enlarged scale, with parts broken away;

Figure 8 is a fragmentary right-hand view on line 8—8 on Figure 2;

Figures 9 through 14 are a schematic electrical diagram of the circuitry associated with the announcing machine shown in Figures 1 through 8;

Figure 15 is a diagram showing the proper physical placement of the drawing sheets containing Figures 9 through 14 to form a proper composite electrical circuit; and Figure 16 is a timing diagram of the closure times of the machine switches and the operate times of the principal circuit relays with reference to the machine functions.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring particularly to Figures 1, 2, and 3, the announcing machine of the present invention includes a shaft 10 rotatively mounted in anti-friction bearings 11 and 12 which are in turn supported centrally of end members 13 and 14, respectively, of a generally cylindrical casing 15, which is surmounted by a superstructure 16. The superstructure 16 consists of a generally rectangular housing secured to the casing 15 as by means of screws 17 and closed by a cover plate 18. The housing 16 supports the traveling carriage and its associated mechanism as hereinafter described.

Rotation is imparted to the shaft 10 by means of a motor 20 whose shaft 21 (Figure 3) carries a worm 22 in meshing engagement with worm gear 23 which is mounted, through anti-friction bearing 24, on an inwardly projecting central boss 25 of the end member 14. The worm gear 23 is connected to a flywheel 26, fast on the shaft 10, through pins 27 carried in resilient bushings 28 mounted in cylindrical receptacles 29 carried by the worm gear 23. Preferably two such cushioned pin connections are provided, one of which is not shown.

Reduced portions of the shaft 10 extend beyond the bearings 11 and 12 and through sealing members 30 and 31, respectively, supported in the end members 13 and 14 respectively. At its left-hand end (Figure 2) the reduced portion 32 of shaft 10 carries a further flywheel 33 to which is secured the drum 34 on which the cylindrical record 35 is mounted. Preferably the record 35 is of resilient magnetic material, and the desired message is magnetically recorded thereon. At its opposite end, the reduced portion 36 of the shaft 10 carries a magnet 37 (Figure 8) and, adjacent thereto, a mercury switch 39 is mounted on bracket 40 secured to the sealing ring 31, the switch 39 being adapted to carry out a synchronization function to be later described.

A dashpot cylinder 41 (Figures 2 and 3) is secured inwardly on the end member 13, as is also a rod-like guide member 42 on which the dashpot piston 43 is slidably mounted. The casing 15 is filled with lubricant to a level above the dashpot 41, 43, and a vaned wheel 44 is secured on the shaft 10 and dips into the said lubricant supply. When the machine is operating, the lubricant is picked up by the wheel 44 and, in the rotation of the latter, flows onto the shaft 10 and thereaiong, thus supplying lubricant to the carriage-driving connection yet to be described.

Referring now to Figures 2, 3, 4 and 7, the movable carriage comprises a pair of transversely spaced, longitudinally extending rods 50 and 51, slidably mounted in bearings formed in the respective ends of the superstructure 16. A generally vertical sleeve-like guide member 52 is secured on the longitudinal rod 51 through an extension 53 terminating in a sleeve 54 encircling the rod 51, and the member 52 carries an opposite extension 55 terminating in a yoke 56 engaging the longitudinal rod 50. The latter carries collars 57 and 58 abutting the respective ends of the yoke 56 to prevent longitudinal movement of the latter relative to the rod 50.

The guide member 52 is centrally apertured to receive a generally vertical rod-like element 59 for reciprocal movement within the guide member 52, the lower end of the rod-like element 59 carrying a half-nut 60 (Figures 2 and 3) which is threaded for engagement with a lead screw thread 61 formed on the shaft 10 (Figure 2). A spring 62, mounted between the lower end of the guide member 52 and the upper surface of the half-nut 60, biases the latter toward its lowered position.

The upper end of the generally vertical element 59 is provided with a lateral extension 63, which is bifurcated at its distal end, as seen in Figure 4, the respective arms 64 embracing a guide screw 65 secured to the upper surface of the guide member 52, thus preventing the element 59 from rotating in the member 52. The extension 63 also carries a pin 66 (Figure 7) on which a roller 67 is secured, the function of which will be described hereinafter. A pin 68 (Figure 4), likewise secured to the lateral extension 63 and extending longitudinally of the carriage engages in the bifurcated arm 69 integral with the colar 58 secured on the rod 50, whereby elevation of the element 59 results in a rocking movement of the rod 50. The rod 51 carries, at its right-hand end (Figure 2) an arm 70 projecting through slot 38 and on which is mounted a magnet 101 for actuating the mercury type limit switch 71 and a mercury type warning signal switch 72. Pointer 38 is also supported by arm 70 and the position of this pointer with respect to recording time scale 87 indicates the elapsed recording time. The switches 71 and 72 are mounted on cover plate 18 by means of a bracket 45, which is adjustable relative guide slot 19 to vary the cycle duration in a manner described hereinafter. The arm 70 also serves for mounting one end of a return spring 73, the other end of which is secured, as at 74, to the opposite end of the superstructure 16.

To the left-hand end (Figure 4) of the slide rod 51 is secured a head mounting bracket 75 to which are pivotally mounted, as at 76 and 77, respectively, erase and recording-reproduction heads 78 and 79, respectively, in tandem relative to the direction of motion of the record 35. Each of the heads 78 and 79 carries a pin 80 and 81 respectively by means of which it may be moved about its aforesaid pivotal mounting. The left-hand end of the slide rod 50, which is capable of a rocking movement, as aforesaid, is provided with a transverse finger 82, one end of which engages a bifurcated lever 83 pivoted at the rearward end of the head mounting bracket 75, and the other end of which engages a bifurcated lever 84 pivoted near the forward end of bracket 75. The lever 83 carries a rearward extension 85 which, upon rocking movement, is adapted to engage and lift the pin 81 fast to the head 79, while the pin 80 of the head 78 is adapted to engage lever 84 when the latter is rocked upwardly by the finger 82. In this manner, when the rod 50 is rocked in a counterclockwise direction (looking from the left in Figure 7), by upward movement of the element 59, the erase and recording-reproducing heads 78 and 79 are simultaneously lifted from the record 35, and upon reverse rocking movement of the rod 50, the heads are again lowered into operative relation with the record. It will be apparent, thus, that movements of the heads 78 and 79 are simultaneous with the elevating and lowering movements of the element 59.

Raising and lowering of the element 59, and the lead screw follower or half-nut 60 carried thereby, are brought about as follows. A "shelf" or longitudinally elongated lever 90 (Figures 4 and 7) is pivoted as at 91, 92 to the wall of superstructure 16, and extends laterally to a point underlying the roller 67 carried by the element 59. The upper surface of the elongated lever 90 is provided with a lug 93 to which is pivoted the connecting rod 94 of a rotary solenoid 95 mounted on the superstructure 16. When the rotary solenoid 95 is energized through instrumentalities to be described hereinafter, the elongated lever 90 is raised, engaging the roller 67 and lifting the element 59 and nut 60, and at the same time raising the erase and recording-reproducing heads 78 and 79 from the record 35 as hereinbefore described. When the follower half-nut 60 leaves the lead screw thread 61 of the shaft 10, the carriage driving connection is, of course, interrupted and the carriage, the longitudinal rods 50, 51, generally vertical guide member 52, and associated mechanism, is returned to zero or starting position by the spring 73, said starting position being at the left-hand end of the machine as seen in Figures 1 and 2. This return movement is, as mentioned before, cushioned by the action of the dashpot 41, 43, the piston 43 being moved through the engagement, in slot 96 of the piston, of the lower end of an arm 97 carried by a diagonal extension 98 of the generally vertical guide member 52.

A mercury switch 99 mounted on bracket 100 secured on the cover 18 of the superstructure 16, senses the return of the carriage to starting position and takes part in the de-energization of solenoid 95, as hereinafter more fully described. The magnet 101 carried by the arm 70 is adapted to actuate each of the switches 71, 72 and 99 as it reaches a position, in the travel of the carriage, opposite the switch in question.

The associated electrical circuitry connected to motor 20, solenoid 95, heads 78 and 79, and machine switches 39, 71, 72 and 99, to establish the proper operational program for the structure shown in Figures 1 through 8 is shown in Figures 9 through 14 when combined in accordance with diagram of assistance shown in Figure 15.

Referring to the electrical circuitry, a recording operation can be initiated from either remote recording station 157 or local recording station 332 (Figure 9). Record key K2 located at the machine control plane (Figure 11) is manually operated to the left in the event that the output of the local recording pre-amplifier comprising tubes T19 and T20 is to energize recording head 79 (Figure 13). In the event that a recording is to be made from the remote recording station 157, record key K2 is maintained in the neutral position shown in the drawing and remote key K4 (Figure 9) is manually actuated.

The sound output of the particular recording station switched into operation is applied to the primary winding of input transformer 211. This input signal is amplified by the four-stage amplifier comprising tubes T10 through tubes T15 (Figure 14), and the amplifier output stage comprising tubes T14 and T15 energizes output transformer 180 (Figure 13). The secondary of output transformer 180 comprises a plurality of windings in which winding 267 energizes head 79 during the recording operation, windings 248 and 249 develop the sound output which is transmitted to telephone line connector 317 (Figure 9) during playback operation, and windings 181 and 182 apply amplifier sound output to the voice alarm circuitry comprising tubes T6 and T7 (Figure 14). The voice alarm circuitry is actuated by any sound gaps in the message being recorded or reproduced and can be employed to actuate appropriate circuitry for operating a voice alarm and also recycling the carriage.

The necessary bias currents applied to head 78 (Figure 13) during the recording operation are generated by the bias oscillator comprising tube T9 (Figure 14) and associated components. This bias oscillator also supplies the erase currents for energizing erase head 78.

The output of head 79 is applied to input transformer 191 during playback operation. The signal developed in the secondary winding of this input transformer is applied to a pre-amplifier comprising tube T8 (Figure 14) and associated components. The pre-amplifier output is applied to the amplifier comprising tubes T10 through T15 with signal output being developed in output transformer 180.

A recycling tone is applied to erase head 78 from one side of the heater source for bias oscillator tube T9 (Figure 14). This recycling tone is reproduced by the erase head 78 during a playback operation and is amplified by the tone pre-amplifier tube T1, tone amplifier tubes T2 and T3 and the tone rectifier and direct-current amplifier comprising tubes T4 and T5 (Figure 13). The output of the tone amplifier appearing at the cathode of tube T5 is appropriately applied to control circuitry for solenoid 95 at the required times to effect recycling of the carriage.

Relays R1 through R12 and associated circuit connections in the main, provide the necessary programming of circuit operations required for machine operation.

The detailed operation of the mechanical structure of the transcription machine shown in Figures 1 through 8, in cooperation with the electrical circuitry shown in Figures 9 through 14 is as follows.

At the outset it is assumed that all circuits are in the de-energized condition and that erase head 78 and record-playback head 79 have a random positioning relative record 35. With the apparatus in this condition, a normal operational program is first described comprising (1) placing the system in readiness for making a message recording, (2) making a recording, (3) generating a recycling tone, (4) recycling the carriage and placing the system in readiness for a playback operation, (5) playback of the previously recorded message, and (6) recycling the carriage in response to the previously recorded recycling tone. The foregoing sequence of operations with reference to the closure times of the machine switches and the operate times of the principal circuit relays is graphically shown in the timing diagram of Figure 16. The understanding of the detailed circuit description will be considerably facilitated by reference to this figure.

(1) *Placing the system in readiness for making a message recording*

Initially master switch 150 is closed, thereby applying alternating line potential from terminals 151 to the primary winding of power transformer 152. The energization of transformer 152 results in the heating of the filament of full-wave rectifier tube T16 and the application of an alternating high voltage to the anodes of tube T16. The full-wave pulsating direct-current appearing between the filament of tube T16 and ground is filtered and divided by the associated resistor, capacitor and inductor components. In a preferred embodiment, relatively smooth direct-current potentials of the order of 300 volts, 320 volts, 340 volts, and 380 volts are applied to terminals 153, 154, 155, and 156 respectively. The potentials appearing between these terminals and ground energize tubes T1 through T15 in the appropriate manner as hereinafter outlined.

The closure of switch 150 also energizes drive motor 20 by a circuit including conductor 158, motor circuit breaker 159, conductor 160, motor 20 and conductor 161. The resulting energization of motor 20, rotates shaft 19 as hereinbefore outlined thereby rotating drum 34 and driving the carriage and heads 78 and 79 relative the drum.

Alarm relay R5, which establishes certain supervisory alarm conditions hereinafter set forth in detail, is de-energized inasmuch as the left terminal of the winding is not returned to ground when the retire alarm key K1 is in the neutral position shown in the drawing. This condition of relay R5 energizes alarm lamp L1 by current flow from 48 volt battery 162 through conductor 163, alarm lamp L1, conductor 167, contact R5c back to ground. The energization of alarm lamp L1 renders a visual indication at the control panel for the machine that the apparatus is not in readiness for proper recording or playback. Additionally, the closure of contact R5e applies ground to alarm conductor 171 by a circuit connection from ground to conductor 169, contact K1d of the retire alarm key, conductor 170, and contact R5e back to alarm conductor 171. The application of ground to conductor 171 energizes an alarm device which may be remotely located at a suitable operating panel in a telephone central office or the like. The opening of contact R5e at this time removes ground from alarm conductor 168.

The retire alarm key K1 is manually actuated to the left in order to remove the aforementioned alarm conditions. With this operation, alarm relay R5 is energized by current flow from battery conductor 163 through conductor 172, resistor 173, the winding of relay R5, conductor 174, conductor 175, and contact K1a, to ground. The energization of alarm relay R5 opens contacts R5c and R5e and closes contact R5d thereby de-energizing alarm lamp L1 and any alarm device connected to alarm conductors 168 and 171 at the telephone central office.

Retire alarm key K1 is manually returned to the neutral position shown in the drawing after only momentary operation, inasmuch as a hold circuit for relay R5 is established by a circuit including conductor 174, conductor 176, contact R5a, conductor 177, conductor 178, conductor 179, and contact R10b back to ground. Contact R10b is in the closed position at this time, inasmuch as voice alarm relay R10 is immediately operated whenever sound output appears at amplifier output transformer 180. In particular, the sound output voltages appearing across serially-connected secondary windings 181 and 182 are applied to the control grid and anode of voice-alarm input tube T6 through conductor 183. The alternating sound currents are rectified by tube T6 and a direct-current potential is developed across resistor 184 and capacitor 185. The resulting potential is applied to the control grid of voice alarm output tube T7 through grid resistor 186. This operation reduces the bias appearing across the control grid-cathode space path of tube T7 to a substantially zero value, whereby considerable cathode current is caused to flow through conductor 187 which is connected to the cathode of tube T7. Conductor 187 is returned to ground by a circuit which includes the winding of relay R10, conductor 188, conductor 189 to the adjustable tap for cathode-bias resistor 190 for push-pull power amplifier tubes T14 and T15.

The sound output appearing across output windings 181 and 182 and applied to voice-alarm input tube T6 is developed at this time inasmuch as record-playback head 79 is connected to the primary winding of playback-amplifier input transformer 191 by a circuit which includes conductor 272 connected to head 79, contact R3c, conductor 193, the primary winding of transformer 191, conductor 194, contact R3a, and conductor 273 back to head 79. The sound input at transformer 191 resulting from the playback of a prior recording is amplified by pre-amplifier tube T8, amplifier tubes T10 through T15 thereby developing a high level output at output transformer 180.

The energization of voice alarm relay R10 establishes a hold circuit for alarm relay R5 by applying ground to the left terminal of the alarm relay winding through conductor 174, conductor 176, contact R5a, conductor 177, conductor 178 and contact R10b back to ground. Thereafter retire alarm key K1 is returned to the neutral position. The opening of contact R10a removes ground from conductor 196 which is connected to voice-alarm lamp L2. This operation de-energizes lamp L2 which in the energized condition is indicative of a defective recording or the failure of sound output at transformer 180 as will hereinafter be outlined in detail. Additionally, the energization of voice alarm relay R10 opens contact R10d, thereby removing ground from voice alarm conductor 199, which is normally grounded through a circuit including retire alarm contact K1e, conductor 198, contact R10d back to voice alarm conductor 199. The application of ground to voice alarm conductor 199 is employed to energize a voice alarm which may be remotely located at a telephone central office or the like. The opening of contact R10c removes ground from voice alarm conductor 197.

With relays R5 and R10 in an energized condition all local and remotely located alarm devices are de-energized indicating that the system is in readiness for a recording operation.

Record key K4 may thereafter be manually operated in order to initiate the recording operation. The closure of this key applies an energizing potential from battery conductor 163, to energize relay R1 in a circuit including conductor 200, contact R5g, conductor 201, contact K2b, contact K2k, conductor 165, record key K4, conductor 202, conductor 203, conductor 204, the winding of relay R1 back to ground through conductor 205. The operation of relay R1 energizes the parallel connected windings for relays R2 and R3 by applying the battery potential appearing on conductor 163 to the left terminal of relay R2 in a circuit which includes conductor 206, contact R1f, and conductor 207 to conductor 208, and to the left terminal of relay R3 from conductor 207 to conductor 209. The right terminals for the windings of both relays are grounded. The closure of contacts R2f and R2h applies the output from remotely located recording microphone 210 to the primary winding of recording input transformer 211. In particular, the microphone signal is amplified by the preamplifier comprising tubes T17 and T18, and the secondary of the pre-amplifier output transformer is included in a circuit comprising conductor 212, contact K2f, conductor 213, contact R2f, conductor 214, primary winding of transformer 211, conductor 215, contact R2h, conductor 216, contact K2h, conductor 217, back to the secondary winding of the pre-amplifier output transformer.

The secondary potential developed in input transformer 211 is applied to the control grid of amplifier tube T10 through a circuit including conductor 218, recording level potentiometer 219, grid resistor 220, conductor 221 and conductor 222. Any signal applied to the control grid of amplifier tube T10 is amplified by the conventional four-stage amplifier comprising tubes T10 through T15. The push-pull output developed across the output stage comprising tubes T14 and T15 is applied to the primary winding of amplifier output transformer by conductors 223 and 224. Plate potential is applied to the anodes of tubes T14 and T15 from power supply output terminal 156 by conductor 225 and the split primary winding of output transformer 180.

Actual recording is delayed for a period of approximately two seconds after the closure of relays R2 and R3 and until such time as record lamp L3 is energized by circuits hereinafter described, thereby rendering a visual signal that the system is in readiness for recording.

The closure of contact R1d discharges capacitor 226 through the winding of relay R7 in a circuit connection which includes contact R1d, conductor 227, conductor 228, resistor 229, conductor 230, conductor 231 and conductor 232 through the left winding of relay R7 back to ground. Relay R7 is operated for a relatively short period of the order of one-half second and until such time as capacitor 226 discharges below the hold value for relay R7. Capacitor 226 normally stands in a charged condition by the application of the battery potential appearing on conductor 163 through conductor 233 and contact R1e.

The momentary operation of relay R7 energizes recycle relay R8 by applying ground to the left terminal of the recycle relay through conductor 234, contact R7b and conductor 235. The closure of contact R8b energizes rotary solenoid 95 by applying the battery potential appearing on conductor 163 to the winding of solenoid 95 in a circuit including conductor 236, contact R8b, conductor 237, and the winding of solenoid 95 back to ground.

The energization of solenoid 95 raises elongated lever 90, thereby engaging roller 67 and lifting element 59 and nut 60, and at the same time raising heads 78 and 79 from record 35. When follower half-nut 60 leaves the lead screw thread 61 of the shaft 10, the carriage driving connection is interrupted and the carriage, driven longitudinal rods 50, 51, guide member 52, and associated mechanism, are recycled or returned to the zero or starting position by spring 73.

Record lamp L3 is de-energized in response to the operation of recycle relay R8 thereby rendering a visual indication that the recording should not commence at this time. It should be noted from the timing diagram shown in Figure 16 that the recycle relay R8 is operated approximately one-half second after record key K4 is first actuated. During this one-half second interval the record lamp L3 is momentarily energized by the same circuit connection which establishes energization of record lamp L3 during the period which actual recording can be undertaken. This circuit connection includes contact R8b and will be described in detail hereinafter in association with the operation which occurs when recycle relay R8 is subsequently de-energized.

It will be recalled that the energization of recycle relay R8 was established through contact R7b. Inasmuch as relay R7 is energized for an interval of the order of a fraction of a second, a hold circuit for relay R8 is established through contact R8a, conductor 238 and contact R6c back to ground.

Sound relay R9 is energized at the same time that recycle relay R8 is operated in response to the momentary operation of relay R7. In particular, the battery potential appearing on conductor 163 is applied to the right terminal of the winding of relay R8 through a circuit including conductor 239, contact R7f, conductor 240, conductor 241 and conductor 299. The closure of contacts R9b and R9d short circuits sound output terminals 242 and 243 of the transmission machine. Line connector circuit 317 is shown connected to terminals 242 and 243 whereby the recorded message can be transmitted over the telephone distribution system during playback. This short circuit is established by a circuit connection including conductor 244 connected to terminal 242, contact R9b, conductor 245, contact R9d, conductor 246 and conductor 259 back to terminal 243.

The return of the carriage to its leftmost position in response to the energization of solenoid 95, results in the closure of carriage return switch 99, inasmuch as magnet 101 carried by arm 70 is driven to a position adjacent switch 99 in response to the recycling of the carriage.

The actuation of carriage return switch 99 at this time is ineffective to promote any circuit operation inasmuch as this switch is connected in series with synchronization switch 39 mounted on bracket 40. As soon as shaft 10 is advanced the necessary fraction of a single revolution required to actuate synchronization switch 39 in response to the close positioning of magnet 38, as is shown in Figure 8, relay R6 is energized inasmuch as the left terminal of the winding of this relay is grounded by a circuit including conductor 251, carriage return switch 99, conductor 252, synchronization switch 39, back to ground through conductor 253. The battery potential appearing on conductor 163 is applied to the right terminal of the winding of the relay R6 through conductor 254.

Relay R6 is energized for only a fraction of a second inasmuch as the synchronization switch 39 is released as soon as magnet 38 advances a very short angular distance beyond the operative position shown in Figure 8. Additionally, carriage return switch 99 is so associated with movable magnet 101 that this switch is closed for less than one revolution of drum 34, whereby the serial connection established by the concurrent closing of synchronization switch 39 and carriage return switch 99 occurs only for a very short angular distance of a single predetermined revolution of drum 34.

The foregoing mode of switch operation synchronizes the starting point of message recording with the starting point of message playback by insuring at all times, synchronization of the sound carriage with the driving means for drum 34. In particular, timed release of contact R6c opens the recycle hold circuit established therethrough for recycle relay R8, thereby de-energizing this relay and releasing contact R8b. The release of contact R8b opens the energizing circuit for solenoid 95 previously established therethrough. The de-energization of solenoid 95 enables motor drive to again be applied to the carriage.

(2) Making a recording

Remote record lamp L3 and panel record lamp L3p are energized in response to the timed release of relay R8 by current flow from battery conductor 163 through conductor 200, contact R5g, conductor 201, contact K2b, contact K2k, conductor 165, remote record lamp L3, conductor 255, conductor 256, contact R8d, conductor 257, panel record lamp L3p, conductor 258 and contact R3e back to ground. The energization of the record lamps gives a visual signal that the recording operation can now be commenced by talking into microphone 210.

Sound relay R9 is a slow release relay and therefore the contacts actuated thereby are held up for approximately half a second beyond the de-energization of recycle relay R8. The release of sound relay contacts R9b and R9d is required in order to remove the short heretofore existing across in the output terminals 242 and 243, thereby applying the amplifier output from secondary windings 248 and 249 of transformer 180 to system output terminals 242 and 243 where the recording process may be monitored. This operation is effected by a circuit including conductor 250 which is connected to the output of transformer 180, contact R9e, conductor 246, and conductor 259 to terminal 243, and conductor 260 which is also connected to the output of transformer 180, contact R9C, and conductor 244, to terminal 242.

Output terminals 242 and 243 are shunted by a monitor jack 247 which is connected to conductors 244 and 259 by means of conductors 261 and 262. Conductors 261 and 262 also provide a relatively high impedance load across output terminals 242 and 243 during recording by a circuit which includes terminal 242, conductor 244, conductor 261, load resistor 263, conductor 264, contact R2a, through ground back to contact R2j, conductor 265, load resistor 266, conductor 262, and conductor 259 back to terminal 243.

The amplified sound appearing across secondary winding 267 of output transformer 180 is applied to recording head 79 by a circuit including conductor 268, resistor 269, conductor 270, conductor 271, contact R3d, conductor 272, through recording head 79, conductor 273, contact R3b, conductor 274 back to ground.

The necessary recording bias is applied to recording head 79 from the bias oscillator comprising tube T9 and associated components connected in a modified Hartley configuration through a circuit connection including conductor 275 connected to the anode of tube T9, capacitor 276, resistor 277, conductor 278, conductor 271, contact R3d, conductor 272, through recording head 79, conductor 273, and contact R3b and conductor 274 back to ground.

Erase head 78 is energized by erase current applied from the bias oscillator comprising tube T9 through a circuit connection including conductor 275, conductor 279, contact R1c, capacitor 280, conductor 281, and erase head 78 to ground.

The cathode for bias oscillator tube T9 is grounded by a circuit including conductor 281 and contact R3j to ground.

The closure of contact R3h grounds the output of the playback pre-amplifier tube T8.

(3) Generating a recycling tone

When the desired message has been recorded on record 35, record key K4 is released thereby de-energizing relay R1. The opening of contact R1f is ineffective, however, to promote the immediate release of the contact loads of relays R2 and R3. In particular, capacitor 283 which shunts the winding of relay R2 is charged during the recording period inasmuch as relay R2 is continuously energized, and the discharge circuit path for capacitor 283 through the windings of relays R2 and R3 has a sufficiently long time constant to maintain these relays energized for approximately one-half second longer than relay R1. The resulting change in the contact loads for relays R1, R2 and R3 completes the necessary circuits for applying a 60-cycle recycling tone from one side of the heater connection for bias oscillator tube T9 to erase head 78 through a circuit including conductor 284, tone control potentiometer 285, contact R2c, conductor 286, contact R1b, and conductor 281 through the erase head 78 to ground. The opening of contact R1b prevents the application of erase current to head 78 during the recording of the recycling tone.

(4) Recycling the carriage

Relays R2 and R3 are released as soon as capacitor 283 is discharged to a value below the hold value for these relays, thereby terminating the recording of the recycling tone. The release of relay R3 momentarily energizes relay R7 by discharging capacitor 287 in a circuit which includes contact R3g, conductor 288, rectifier 289, conductor 228, resistor 229, conductor 230, conductor 231, conductor 232, and the left winding of relay R7 back to ground. The momentary closure of the contact load for relay R7 energizes relays R8 and R9 as hereinbefore set forth.

The closure of contact R8b energizes solenoid 95 by current flow through the circuit hereinbefore set forth. The operation of solenoid 95 effects recycling as hereinbefore set forth, thereby returning the carriage to its leftmost position and heads 78 and 79 to the left edge of record 35.

(5) Playback of recording

The closure of carriage return switch 99 together with the closure of synchronization switch 39 energizes relay R6 as hereinbefore set forth thereby causing relays R8 and R9 to release their contact loads. The opening of contact R8b deenergizes solenoid 95 thereby enabling shaft 10 to again synchronously drive the machine carriage carrying heads 78 and 79 when the heads are under the starting point of the recording.

Record-playback head 79 is connected to the primary winding of playback-preamplifier input transformer 191 by a circuit connection including conductor 272 connected to head 79, contact R3c, conductor 193, the primary winding of transformer 191, conductor 194, contact R3a, and conductor 273 back to head 79. The input signal appearing across the control grid of pre-amplifier tube T8 is applied to the input of amplifier tube T9 through a circuit connection including playback level potentiometer 290 and associated resistors and capacitors and conductor 222. This signal is amplified by the stages comprising tubes T10 through T15, and the resulting output appearing across secondary windings 248 and 249 of output transformer 180 is applied to system output terminals 242 and 243 as hereinbefore set forth.

(6) Recycling the carriage in response to the recycling tone

The previously recorded recycling tone is played back shortly after the termination of the recorded message. This tone is applied to the control grid of tone preamplifier tube T1 from erase head 78 by a circuit including conductor 281 connected to erase head 78, contact R1b, conductor 286, contact R2b and conductor 291. The amplified tone is applied to the control grid of tone amplifier tube T2 the output of which is coupled to the control grid of tone amplifier tube T3. The signal voltage appearing in the plate circuit of tone amplifier tube T3 is applied to the multiple connected control grid and anode of tube T4. The rectified potential appearing across capacitor 292 and resistor 293 is applied to the control grid of tube T5 through limiting resistor 294. This action reduces the potential appearing across the control grid-cathode space path of tube T5 to substantially a zero level whereby an energizing current is provided for tone relay R11 through a circuit including conductor 295 connected to the cathode of tube T5, the winding of relay R11, conductor 296, conductor 189, to the center tap of bias resistor 190 for tubes T14 and T15.

Sound relay R9 is operated in response to the closure of contact R11b by current flow from battery conductor 163 in a circuit including conductor 297, contact R11b, conductor 298, conductor 299, and the winding of sound relay R9 to ground. The resulting closure of contacts R9b and R9d shorts output terminals 242 and 243 as hereinbefore set forth thereby preventing the transmission of any spurious sounds during the recycling operation and prior to a succeeding playback period.

Relay R7 is energized in response to the operation of relays R9 and R11 by current flow from battery conductor 163 in a circuit which includes conductor 300, contact R11a, conductor 301, contact R9a, conductor 302, conductor 232, and the left winding of relay R7 back to ground. Recycle relay R8 is operated in response to the operation of relay R7 by current flow from battery conductor 163 in a circuit including conductor 303, the winding of recycle relay R8, conductor 235, contact R7b and conductor 234 to ground.

The contact loads of relays R7 and R11 are released in response to the completed playback of the recycling tone. The hold circuit established through contact R8a, conductor 239 and contact R6c back to ground maintains relay R8 in the energized condition notwithstanding the deenergization of relay R7.

Solenoid 95 is energized in response to the operation of recycle relay R8 by current flow from the battery conductor 163 and a circuit including conductor 236, contact R8b, conductor 237, the winding of solenoid 95 back to ground. This operation recycles the carriage and heads 78 and 79 of the recording machine as hereinbefore set forth. Solenoid 95 remains in the energized condition after recycling until such time as carriage return switch 99 and synchronization switch 39 are simultaneously closed whereby relay R6 is energized as hereinbefore set forth. Relays R8 and R9 are de-energized in response to the operation of relay R6 thereby de-energizing solenoid 95 and providing for the application of drive from shaft 10 to the machine carriage as hereinbefore set forth.

The apparatus is now in condition for a second or repeat playback operation which occurs in a manner identical to that described with respect to the playback operation hereinbefore set forth.

Voice alarm features

Voice alarm relay R10 and associated circuits provide certain control operations which are operative in response to the malfunctioning of the machine or its improper use by an operator.

It will be recalled that voice alarm relay R10 is initially operated after the momentary actuation of the retire alarm key K1 to the left. This operation applies sound output from output windings 181 and 182 to the control grid and anode of tube T6 through conductor 183. The rectified sound pulses develop a direct-current potential across resistor 184 and capacitor 185 which is applied to the control grid of tube T7 through grid resistor 186. The substantial cathode current flow through conductor 187 operates voice alarm relay R10.

In the event, however, that sound is not applied to the input of tube T6 from output transformer 180 for a period sufficiently long to permit capacitor 185 to discharge through resistor 184 to a value which will no longer maintain sufficient current flow through the cathode-anode space path of the tube T7 to hold relay R10, then this relay is released.

It may be readily appreciated that for purposes of making recordings for playback over telephone distribution lines that sound gaps in the recorded message of the order of several seconds cannot be tolerated. The existence of such a sound gap causes the release of relay R10, and the closure of contact R10a energizes voice alarm L2 through a circuit hereinbefore set forth. Additionally, the release of contact R10c and the closure of contact R10d actuates a visual or audible telephone office alarm.

These alarms are also actuated in the event there is a failure of sound reproduction during playback.

Circuits are also associated with the contact load of voice alarm relay R10 and busy relay R4 to initiate recycling of the machine in the event of recycling tone failure. In particular, the discharge time constant of the RC circuit comprising components 184 and 185 may be appropriately adjusted to a desired value to provide recycling within, for example, two seconds after the end of the recorded message in the event of tone failure.

The recycling operation in this instance is established by the following circuit operation. The de-energization of relay R10 opens the hold circuit for alarm relay R5 established through contact R10b. The de-energization of relay R5 releases contact R5b thereby energizing busy relay R4 by current flow from battery conductor 163 in a circuit which includes the winding of relay R4, conductor 304, conductor 305 and contact R5b back to ground. The resulting closure of contact R4b discharges capacitor 306 through the left winding of relay R7 in a circuit including contact R4b, conductor 307, rectifier 308, conductor 309, conductor 231, conductor 232, and the left winding of relay R7 back to ground. The operation of relay R7 energizes recycle relay R8 and actuates solenoid 95 as hereinbefore set forth, thereby promoting recycling of the machine. Capacitor 306 is initially charged by current flow from battery conductor 163, through resistor 310, contact R4a, and capacitor 306 back to ground.

Limit functions

In the event that a recording is made which extends to the recording limits of record 35, magnet 101 is moved by the carriage to a close positioning with respect to limit mercury switch 71 as is shown in Figure 2. This operation closes switch 71 and causes alarm relay R5 to release its contact load to effect recycle of the carriage as follows: In particular, the right terminal of the winding of relay R5 is returned to ground by a circuit connection including conductor 311, conductor 312, and limit switch 71 to ground. This connection removes the battery potential normally applied to the winding through conductor 163, conductor 172 and resistor 173. The right winding of relay R7 is energized in response to the closure of contact R5f by current flow from battery conductor 163 in a circuit including conductor 313, right winding of relay R7, conductor 314, conductor 315, contact R5f, conductor 312, through limit switch 71 back to ground. The energization of relay R7 energizes relays R8 and R9 as hereinbefore set forth thereby energizing solenoid 95 and shorting output terminals 242 and 243. The carriage is accordingly recycled and the input to the line connector 317 is shorted out.

In view of the fact that limit switch 71 is manually adjustable relative the carriage, the positioning of this switch may be so set up as to establish any desired maximum time limit on the recording and playback cycle time.

It should also be noted that limit switch 71 also provides a safeguard recycling function in the event of failure of tone recycling or voice alarm recycling.

Warning functions

Warning switch 72 is positioned adjacent limit switch 71 so that magnet 101, which travels with the carriage, is capable of closing the warning switch approximately 15 seconds before the limit switch is closed. The closure of the warning switch energizes warning lamp L6 located at the remote recording station, thereby rendering a visual indication or warning that there is only approximately 15 seconds remaining recording time available. Warning lamp L6 is energized by current flow from conductor 163 in a circuit including conductor 200, contact R5f, conductor 201, contact K2b, contact K2k, conductor 165, warning lamp L6, rectifier 330, conductor 331, conductor 332, and warning switch 72 to ground.

Operation of line relay

The line relay R12 is in the normally open condition so as to make a circuit path available for recycling the carriage of the transcription machine when a new call requesting transcription service sends a circuit ground from the telephone line equipment. This is done so that there will be a minimum of waiting time before the call is answered. With the line relay in the de-energized condition, a circuit path is made available when a ground is placed on the call waiting conductor 316 by the LK relay of the line connector circuit 317. The circuit path for energizing line relay R12 is as follows: Beginning from the LK relay within line unit 317, conductor 316, contact a on call recycle key K5, conductor 318, line relay contact R12a, the rectifier 319, capacitor 320 and shunting resistor 321, conductor 322, conductor 314, the right winding of relay R7, and conductor 313 to battery conductor 163.

When line relay R12 is in the foregoing operative condition in response to calls that are being answered, the line relay interrupts the foregoing circuit path. This operation keeps the machine from recycling until all calls are answered. This is accomplished by a circuit path from the CT relay within the line connector unit 317 being operated while answering the call. This sends a ground path along conductor 323, call recycle contact K5b, conductor 324, the winding of line relay R12, and conductor 324 back to battery conductor 163.

Call waiting lamp L4 and call answered lamp L5 render visual indications of the line conditions in which a call is awaiting answer and a call is being answered, respectively.

Operation of busy relay

It may be readily appreciated that during the recording operation, it is desirable to transmit a busy signal over any telephone lines desiring message service from the transcription machine herein. Accordingly, assuming that the recording is to be made from the remote recording station 157, make busy key K3 is manually operated thereby applying ground to the left terminal of busy relay R4 through a circuit including key K3, conductor 164 and conductor 304. The closure of contact R4i applies ground over busy conductor 165 thereby applying a busy signal to any lines calling for message service.

Busy relay R4 is also operable in response to the closure of make busy key K6 or recording make busy key K7. Both of the foregoing busy keys are located at the control panel so that they are manually operable at the desired times. The operation of the busy relay R4 also removes the circuit ground pulses of relays R6 and R7 thereby rendering the telephone line equipment inoperative. This action energizes lamp L7 on the control panel and de-energizes lamp L8 located on the same panel thereby rendering a visual indication that the telephone line circuits are inoperative. Operation of the busy relay in dual machine systems, causes the telephone line equipment to transfer to another machine in the bank of transcription machines.

When busy relay R4 is operated or released, one or other of capacitors 306 or 331 discharges through relay R7, thereby recycling the carriage of the transcription machine. This feature of operation is provided for remote position recycling of the machine carriage while listening to the recording before removing the busy condition from the telephone line equipment.

Miscellaneous features

Local recording station 332 is provided in the event that it is desired to record a message from a station located near the telephone frame supporting the transcription apparatus. The mode of recording operation in this instance is substantially identical to that previously described with respect to recording from remote recording station 157. The local recording station is appropriately connected to the control panel circuitry by manually operating record key K2 to the left, thereby connecting the output of the preamplifier comprising tubes T19 and T20 to the primary winding of sound input transformer 211.

Alarm relay R5 which establishes the various alarm functions hereinbefore set forth, is automatically retired by manually operating retire alarm key K1 to the right. With this key positioning, the various alarms are automatically retired when there is a momentary voice failure or the machine is recycled by operation of limit switch 71.

Record 35 is erased by operating key K2 to the right. This key operation disenables both the local and recording stations and short circuits the sound input to the recording amplifier. Contact K2j establishes a necessary delay operation so that erasure will begin after the transcription machine has recycled.

It is to be understood that the above-described arrangements are illustrative to the applications of the principles of this invention. Numerous other arrangements may be devised by those skilled in the art without departing from the scope of this invention.

Having thus described the invention, what is claimed as new and desired to be secured by Letters Patent is:

1. In an automatic announcing machine, in combination, a cylindrical record, means to rotate said record about its cylinder axis, a carriage, means supporting said carriage for movement in a path parallel to said axis, recording and reproducing means mounted on said carriage and movable therewith in operative juxtaposition to said record, driving means for advancing said carriage along said path in one direction, return means for moving said carriage in the opposite direction, means operatively connecting said carriage and said driving means, and control signal-responsive means including an electrically actuated switch, means for energizing said switch, and switch means connected to said actuated switch and actuatable in response to said control signal for disconnecting said carriage and driving means in response to a signal recorded on said record and for actuating said return means to return said carriage to its initial position.

2. The combination defined in claim 1, said electrically actuated switch including a solenoid, means for energizing said solenoid comprising a circuit including a power source, and switch means in said circuit actuable in response to said signal.

3. The combination defined in claim 2, including additional switch means in said circuit and actuable upon return of said carriage to starting position for reestablishing said operative connection of said carriage and driving means.

4. The combination defined in claim 1, said record rotating means including a shaft disposed axially of said record and motor means for rotating said shaft, and said carriage driving means including lead screw means operatively associated with said shaft, said means operatively connecting said carriage and said driving means comprising follower means engageable with said lead screw means and disengageable therefrom.

5. The combination defined in claim 4, said signal-responsive means including means for disengaging said follower means from said lead screw means.

6. The combination defined in claim 5, said disengaging means including a solenoid, means for energizing said solenoid comprising a circuit including a power source, and switch means in said circuit actuable in response to said signal.

7. The combination defined in claim 6, including additional switch means in said circuit and actuable upon return of said carriage to starting position for reestablishing said operative connection of said carriage and driving means.

8. The combination defined in claim 7, including further switch means in said circuit actuable once in each rotation of said shaft.

9. The combination defined in claim 8, said last mentioned switch means being positioned adjacent said shaft, and means mounted on and adjustable circumferentially about said shaft for actuating said last-mentioned switch means.

10. The combination defined in claim 2, including limit switch means in said circuit and actuable when said carriage reaches a predetermined position.

11. The combination defined in claim 10, said last mentioned switch means being adjustable along the path of said carriage to vary the maximum travel thereof in the advancing direction.

12. The combination defined in claim 10, including warning switch means in said circuit and actuable when said carriage reaches a predetermined position near the position at which said limit switch is actuable.

13. The combination defined in claim 12, said limit switch means and said warning switch means being adjustable together along the path of said carriage.

14. The combination defined in claim 1, including dashpot means for cushioning the return movement of said carriage.

15. The combination defined in claim 4, including a casing enclosing said shaft and said follower means, a supply of lubricant in said casing below said shaft, and means on said shaft and dipping into said lubricant for moving lubricant onto said shaft during rotation thereof.

16. The combination defined in claim 15, including dashpot means for cushioning the return movement of said carriage, said dashpot comprising a cylinder and a piston both immersed in said lubricant, one of said dashpot elements being fixed and the other being movable with said follower means.

17. The combination defined in claim 15, including dashpot means for cushioning the return movement of said carriage, said dashpot comprising a cylinder and a piston both immersed in said lubricant, one of said dashpot elements being fixed and the other being movable with said follower means, and guide means fixedly associated with said fixed element and slidably engaging said movable element.

18. The combination defined in claim 4, said carriage including a generally vertical guide member, said follower means including a generally vertical element supported for guided reciprocation along said guide member and said combination including a horizontally elongated member horizontally pivoted adjacent the path of said carriage and connected to be operated by said solenoid and operatively associated with said generally vertical element to lift the same upon energization of said solenoid.

19. The combination defined in claim 18, said carriage also including a longitudinal member mounted for oscillation about its long axis, a linkage connecting said generally vertical element and said longitudinal member to rock the latter when said element is lifted, and a linkage connecting said longitudinal member and said recording and reproducing means to lift the latter from said record when said solenoid is energized.

20. The combination defined in claim 19, said recording and reproducing means including two recording and reproducing heads pivotally mounted in tandem relative to the motion of said record, said linkage means connecting said longitudinal member to each of said heads for simultaneous movements of the heads about their respective pivots.

21. In an automatic announcing machine, in combination, a cylindrical record, means to rotate said record about its cylinder axis, a carriage, means supporting said carriage for movement in a path parallel to said axis, recording and reproducing means mounted on said carriage and movable therewith in operative juxtaposition to said record driving means for advancing said carriage along said path in one direction, return means for moving said carriage in the opposite direction, means operatively connecting said carriage and said driving means, means for automatically recording a tone at the end of a recorded message, and means responsive to the reproduction of said recorded tone for disconnecting said carriage from said driving means.

22. In a machine for reproducing recordings, in combination, a record drum, means to rotate said record drum about its longitudinal axis, a carriage, means supporting said carriage for movement in a path parallel to said axis, recording and reproducing means mounted on said carriage and movable therewith in operative juxtaposition to said record drum, driving means for advancing said carriage along said path in one direction, return means for moving said carriage in the opposite direction, means operatively connecting said carriage and said driving means, means for automatically recording a tone at the end of a recorded message, and means responsive to the reproduction of said recorded tone for disconnecting said carriage and from said driving means and enabling said return means to move said carriage in the opposite direction.

23. In a machine for making and reproducing recordings, in combination, a record drum, means to rotate said record drum about its longitudinal central axis, a carriage, means supporting said carriage for movement in a path parallel to said axis, recording-reproducing means mounted on said carriage and movable therewith in operative juxtaposition to said record drum, driving means for advancing said carriage along said path on one direction, return means for moving said carriage in the opposite direction, means operatively connecting said carriage and said driving means, means for automatically recording a tone pulse at the end of a recorded message, means responsive to the reproduction of said recorded tone pulse for disconnecting said carriage from said driving means and enabling said return means to move said carriage in the opposite direction, and means actuable upon return of said carriage to its starting position for re-establishing said operative connection of said carriage and driving means.

24. In a recording machine having a cylindrical magnetic record rotatable about its cylinder axis and a carriage supporting a recording head adjacent said cylinder and movable in a linear path parallel to said axis, the improvement for initiating carriage movement in response to the positioning of said head adjacent a specified point on said record for a single predetermined revolution, comprising a first switch actuated in response to and during the rotation of said cylinder throughout a substantial portion of said predetermined revolution, and a second switch momentarily actuated once during each revolution of said cylinder including the revolution in which said head is adjacent said point, and means for moving said carriage in its linear path and operated initially in response to the simultaneous actuation of both of said switches.

25. In a machine for recording and reproducing messages having a record rotatable about an axis and a carriage supporting a signal head adjacent said record and movable transversely of said moving record surface, the improvement for initiating carriage movement in response to the positioning of said head adjacent a specified point on said record for a single predetermined revolution, comprising means actuated in response to and during the rotation of said record throughout only a part or all of said predetermined revolution, and second means momentarily actuated once during a plurality of record revolutions including the revolution in which said head is adjacent said point, and means for driving said carriage transversely of said moving record surface operated initially in response to the simultaneous actuation of both of said means.

26. In a machine for recording and reproducing messages having a record rotatable about an axis and a recording-reproducing head supported adjacent said record, the improvement for initiating sound recording and sound reproduction in response to the positioning of said head adjacent a specified point on said record for a single predetermined revolution, comprising means actuated in response to and during the rotation of said record throughout only a part or all of said predetermined revolution, and second means momentarily actuated once during a plurality of record revolutions including the revolution in which said head is adjacent said point, and means for initiating sound recording or sound reproduction as desired in response to the simultaneous actuation of both of said means.

27. In a machine for making and reproducing recordings, in combination, a record drum, means to rotate said record drum about its longitudinal axis, a carriage, means supporting said carriage for movement in a path parallel to said axis, recording and reproducing means mounted on said carriage and movable therewith in operative juxtaposition to said record drum, driving means for advancing said carriage along said path in one direction, return means for moving said carriage in the opposite direction, means operatively connecting said carriage and said driving means, means for automatically recording a tone at the end of a recorded message, means responsive to the reproduction of said recorded tone for disconnecting said carriage from said driving means and enabling said return means to move said carriage in the opposite direction to its initial position, and means defining a limiting point on said record drum beyond which it is not permissible to record a message, said means being operable to disconnect said carriage from said driving means thereby enabling said return means to move said carriage in the opposite direction in the event an attempt is made to extend a recording beyond the defined record limit.

28. In a machine for making and reproducing recordings, in combination, a record drum, means to rotate said record drum about its longitudinal axis, a carriage, means supporting said carriage for forward movement in a path parallel to said axis, recording and reproducing means mounted on said carriage and movable therewith in operative juxtaposition to said record drum, driving means for advancing said carriage along said path in one direction, return means for moving said carriage in the opposite direction, means operatively connecting said carriage and said driving means, means limiting the maximum forward movement of said carriage, means defining the message cycle by automatically recording a tone pulse at the end of a recorded message, means responsive to the reproduction of said recorded tone pulse for disconnecting said carriage from said driving means and enabling said return means to move said carriage in the opposite direction, and means including said limiting means operative in response to the failure of said tone pulse to return said carriage for disconnecting said carriage from said driving means and enabling said return means to move said carriage in the opposite direction.

29. In an automatic announcing machine having a message record and one or more heads coupled to said record for recording and reproducing a message on said record, the improvement comprising a monitor supervising the sound input into said machine during a recording operation and supervising sound output from said machine during a reproducing operation and including means for maintaining an output signal from said monitor only in the event that there is no lapse in the monitored sound in excess of a predetermined period of time, and a sound alarm actuated in response to the absence of an output signal from said amplifier.

30. In an automatic announcing machine having a message record and a signal head coupled to said record and movable relative thereto for recording and reproducing a message on said record, the improvement comprising an amplifier monitoring the sound input into said machine during a recording operation and monitoring sound output from said machine during a reproducing operation and including an integrating network for maintaining an output signal from said amplifier only in the event that there is no lapse in the monitored sound in excess of a predetermined period of time, a sound alarm actuated in response to the absence of an output signal from said amplifier, and means connected to said amplifier output for recycling the signal head relative said record to a message starting point in response to the absence of an output signal from said amplifier.

31. In a machine for making and reproducing a recording having a message record and signal means coupled to said record for recording and reproducing a message on said record, the improvement comprising an amplifier monitoring the sound input into said machine during a recording operation and monitoring sound output from said machine during a reproducing operation and including an integrating network for maintaining an output signal from said amplifier only in the event that there is no lapse in the monitored sound in excess of a predetermined period of time, and means connected to said amplifier output for recycling the signal means relative said record to a message starting point in response to the absence of an output signal from said amplifier.

32. In a machine for making and reproducing a recording having a message record and signal means coupled to said record for recording and reproducing a message on said record, the improvement comprising a monitor supervising the sound input into said machine during a recording operation and supervising sound output from said machine during a reproducing operation and including means for maintaining an output signal from said monitor only in the event that there is no lapse in the monitored sound in excess of a predetermined period of time, means for automatically recording a tone pulse at the end of a recorded message, means responsive to the reproduction of said recorded tone pulse for recycling said signal means to an initial starting point relative said record, and means connected to the output of said monitor for recycling said signal means in response to tone pulse failure or the absence of an output signal from said amplifier.

33. In a machine for making and reproducing recordings, in combination, a record drum, means to rotate said record drum about its longitudinal axis, a carriage, means supporting said carriage for movement in a path parallel to said axis, recording and reproducing means mounted on said carriage and movable therewith in operative juxtaposition to said record drum, driving means for advancing said carriage along said path in one direction, return means for moving said carriage in the opposite direction, means operatively connecting said carriage and said driving means, means for automatically recording a tone pulse at the end of a recorded message, means responsive to the reproduction of said recorded tone for disconnecting said carriage from said driving means and enabling said return means to move said carriage in the opposite direction, means supervising sound input into said machine during a recording operation and supervising sound output from said machine during a reproducing operation and including means for maintaining an output signal from said supervising means only in the event that there is no lapse in the monitored sound in excess of a predetermined period, and means connected to the output of said supervisory means for disconnecting said carriage from said driving means and enabling said return means to move said carriage in the opposite direction in response to tone pulse failure or the absence of an output signal from said amplifier.

34. In a machine for recording and reproducing recordings, in combination, a record drum, means to rotate said record drum about its longitudinal axis, a carriage, means supporting said carriage for forward movement in a path parallel to said axis, recording and reproducing means mounted on said carriage and movable therewith in operative juxtaposition to said record drum, driving means for advancing said carriage along said path in one direction, return means for moving said carriage in the opposite direction, means operatively connecting said carriage and said driving means, means for automatically recording a tone at the end of a recorded message, means responsive to the reproduction of said recorded tone for disconnecting said carriage from said driving means and enabling said return means to move said carriage in the opposite direction, a limit switch adjustably positioned relative said carriage, means movable in association with said carriage and actuating said switch when said carriage has advanced in the forward direction to an extent defined by the adjustment positioning of said switch relative said carriage, and means operable in response to the actuation of said switch for disconnecting said carriage from said driving means and enabling said return means to move said carriage in the opposite direction.

35. The combination of claim 34 including a warning switch adjustably movable in association with said limit switch and operated by said switch actuating means a predetermined period prior to the actuating of said limit switch, and a warning device operated in response to the actuating of said warning switch thereby rendering an indication that the machine is approaching the record cycle limit.

36. In an automatic announcing machine, in combination, a cylindrical record, means to rotate said record about its cylinder axis, a carriage, means supporting said carriage for movement in a path parallel to said axis, recording and reproducing means mounted on said carriage and movable therewith in operative juxtaposition to said record, driving means for advancing said carriage along said path in one direction, return means for moving said carriage in the opposite direction, means operatively connecting said carriage and said driving means, means for automatically recording a control tone on said record at the end of a recorded message, means for disconnecting said carriage and driving means and means for enabling said return means to return said carriage to its initial position in response to said control tone, and a recording time indicator including a fixed time scale and a pointer movable in association with said carriage.

References Cited in the file of this patent

UNITED STATES PATENTS

| | | |
|---|---|---|
| 2,552,788 | Hoover | May 15, 1951 |
| 2,724,015 | Van Deventer | Nov. 15, 1955 |
| 2,766,323 | Handschin | Oct. 9, 1956 |
| 2,779,825 | Cunningham | Jan. 29, 1957 |
| 2,787,669 | Flan | Apr. 2, 1957 |
| 2,788,395 | Kobler | Apr. 9, 1957 |
| 2,793,252 | Augustadt | May 21, 1957 |